United States Patent [19]

Hansson

[11] 4,038,003
[45] July 26, 1977

[54] INJECTION MOLDING MACHINE

[75] Inventor: Jan Erik Enefrid Hansson, Viken, Sweden

[73] Assignee: Sund-Akesson Aktiebolag, Helsingborg, Sweden

[21] Appl. No.: 728,784

[22] Filed: Oct. 1, 1976

Related U.S. Application Data

[63] Continuation of Ser. No. 574,850, May 6, 1975, abandoned.

[30] Foreign Application Priority Data

May 14, 1974 Sweden .............................. 7406408

[51] Int. Cl.$^2$ .............................................. B29C 1/00
[52] U.S. Cl. ...................................... 425/137; 425/154; 425/451.2
[58] Field of Search ........... 425/DIG. 205, DIG. 231, 425/DIG. 223, 136, 137, 151, 154, 242 R, 451.2

[56] References Cited

U.S. PATENT DOCUMENTS

| | | | |
|---|---|---|---|
| 2,801,442 | 8/1957 | Moslo | 425/137 |
| 3,564,657 | 2/1971 | Aoki | 425/137 |

Primary Examiner—Richard B. Lazarus
Attorney, Agent, or Firm—Lerner, David, Littenberg & Samuel

[57] ABSTRACT

An injection molding machine providing a stationary and a movable mold plate, each supporting one mold half, a drive means for the movable mold plate to close the mold and a rear end piece constituting a thrust from the drive means at the closing of the mold. Damage to the sealing surfaces of the mold due to objects stuck between the mold halves is eliminated by preventing a closing pressure from being applied to the mold if an object is located between the sealing surfaces all with a high degree of sensitivity without jeopardizing the rigidity or operational reliability of the machine.

1 Claim, 1 Drawing Figure

U.S. Patent  July 26, 1977  4,038,003
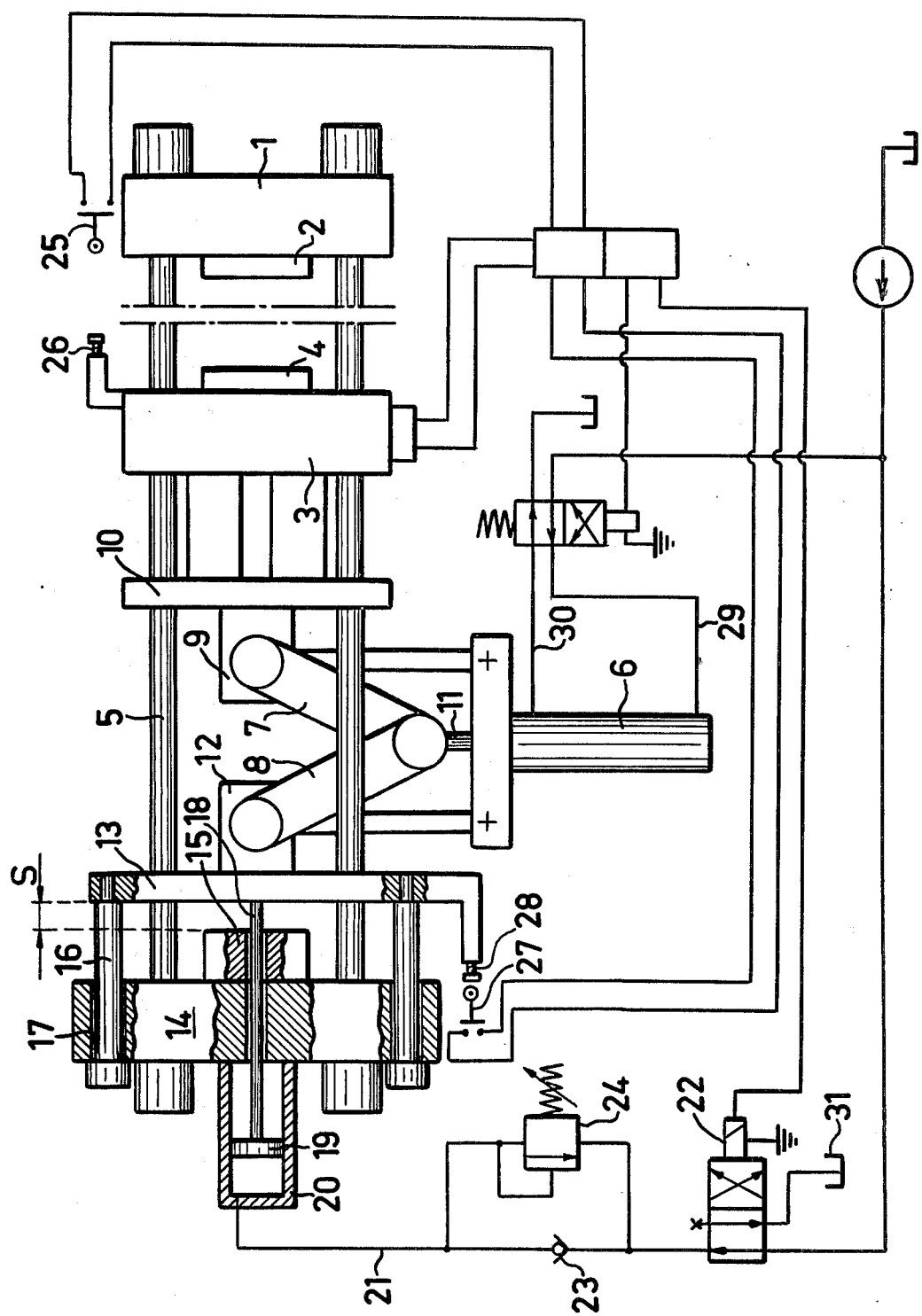

INJECTION MOLDING MACHINE

This is a continuation of application Ser. No. 574,850, filed May 6, 1975 and now abandoned.

BACKGROUND OF THE INVENTION

In an injection molding machine comprising a stationary and a movable mold plate, the force retaining the mold closed during the injection operation must be very substantial in order to resist the high pressures which occur during injection molding. The mold surfaces, therefore, can be subjected to great damages upon closing of the mold if, at the time of the preceding injection, a molded object should have been stuck between the mold halves. The resulting problems can be particularly serious in automatic operation because then the mold halves are not inspected between injections. Others have attempted to correct this problem in different forms of apparatus such as is shown in U.S. Pat. Nos. 2,801,442 and 3,564,657. In U.S. Pat. No. 2,801,442, the sensing of an object within the mold is achieved when pressure is being applied at a high level and, consequently, there can be damage to the molds before reversal of pressure if effected. Additionally, U.S. Pat. No. 3,564,657 is not directed to the same type of molding operation as the present invention, i.e., a two-part mold wherein high pressure is applied in order to withstand injection pressures. Rather, U.S. Pat. No. 3,564,657 is directed to a three-part mold without provision for low pressure initial contact of the molds with high pressure application after closing of the two molds.

SUMMARY OF THE INVENTION

In contradistinction, the present invention is directed to an injection molding machine in which there is provided a stationary and a movable mold plate, each supporting one mold half. A drive means is provided for the movable mold plate to close the mold and, additionally, there is provided a rear end piece constituting a thrust for the drive means at the closing of the mold. A link plate is disposed between the drive means and the rear end piece with a hydraulic cylinder holding the link plate at a distance from the rear end piece during the closing of the mold. A first limit switch is provided for indicating the contact of the mold halves with each other so as to determine that there is no foreign objects between the mold halves. A second device is provided for indicating movement of the link plate toward the rear end piece. The drive means is capable of applying closing pressure to the mold only when the limit switch is actuated before the second device. A control system is provided to maintain a high pressure in the hydraulic cylinder in the starting phase of the mold closing and a low adjustable pressure in the final phase of the mold closing in order to press the link plate back towards the rear end piece. The drive means is capable of pulling back the movable mold plate when the second indicating device is actuated first indicating that there is an object stuck between the mold pieces.

Although this invention will be described with respect to its preferred embodiments, it should be understood that many variations and modifications will be obvious to those skilled in the art, and it is preferred, therefore, that the scope of the invention be limited, not by the specific disclosure herein but only by the appended claims.

DETAILED DESCRIPTION OF THE DRAWINGS

An embodiment of the invention is described with reference to the FIGURE showing the injection molding machine according to the present invention.

The injection molding machine comprises a stationary mold plate 1 provided with one mold half 2, and a movable mold plate 3 provided with the other mold half 4. The movable mold plate 3 is displaceable to and from the stationary plate 1 along drawbars 5 by a drive means in the form of a linkage comprising a power producing hydraulic cylinder 6 and two links 7, 8. The forwardly located link 7 extends from a link mounting 9 in a guide plate 10, which is rigidly connected with the movable mold plate 3, to the piston rod 11 of the hydraulic cylinder 6. The rearwardly located link 8 extends from a rear link mounting 12 on a link plate 13 to the piston rod 11.

A rear-end piece 14 with a mechanical stop member 15 at the other end of the drawbars 5 constitutes a thrust for the linkage at the closing of the mold. The link plate 13 is disposed in front of the mechanical stop member 15 of the rear-end piece and is movable through a short distance s to and from said stop member. By means of guide pins 16 guided in holes 17 in the rear-end piece, the link plate 13 is prevented from tilting.

The link plate 13 is connected to a piston rod 18, which is guided by a piston 19 in a relatively small hydraulic back-pressure cylinder 20 with rigid connection to the rear-end piece 14. Hydraulic pressure medium is supplied to the back-pressure cylinder 20 through a conduit 21 via a directional valve 22 and a check valve 23. In parallel with the check valve 23 an adjustable overflow valve 24 is connected.

A first breaker 25 is provided to indicate that the mold halves 2, 4 have been closed. This breaker may, for example, be arranged at the mold plates or in connection to the linkage. According to the embodiment shown, the breaker 25 is disposed at the stationary mold plate 1. The breaker is actuated by an adjustable stop member 26 on the movable mold plate 3 when the mold has been closed.

A second breaker 27 is provided at the rear-end piece 14 and actuated by an adjustable stop member 28 on the link plate 13 as soon as the link plate is moved out of its position at the distance s from the mechanical stop member 15.

At operating machine, the mold is closed thereby that pressure medium is supplied into the power producing cylinder 6 through a conduit 29. The piston rod 11 is lifted and presses apart the links 8, 9. This implies movement of the movable mold plate 3 towards the stationary mold plate 1. The acceleration force, which simultaneously tries to press the link plate 13 rearward, is counteracted by the pressure in the cylinder 20 which keeps the link plate 13 in its forward position. As soon as the mold is closed, the first breaker 25 is actuated by the stop member 26.

The power producing cylinder 6 continues to build up the mold closing pressure. The pressure in the back-pressure cylinder 20 is thereby surmounted, and the link plate is pressed back in the direction to the mechanical stop member 15 whereby the second breaker 27 is actuated by the stop member 28.

If at mold closing a previously molded object would have stuck between the sealing surfaces of the mold halves, the closing of the mold is prevented and the link plate 13 is pressed back so that the second breaker 27 is actuated first. The breaker then emits an impulse by which the supply of pressure medium to the power producing cylinder 6 is shifted from the conduit 29 to the conduit 30, and the mold is opened.

For producing the final pressing force to close the mold by the power producing cylinder 6, it is, thus, necessary that the first breaker 25 is actuated before the second breaker 27.

For obtaining a satisfactory protection against damages on the mold surfaces, it must be possible to press back the link plate 13 by a very low force, so that the closing movement is interrupted before the mold closing pressure has become too high. The link plate 13, however, must not be pressed back by the acceleration forces arising at the beginning of the closing movement.

During the closing movement, the link plate 13 is retained in its forward position by the back-pressure cylinder 20. At the beginning of the closing movement, the cylinder 20 communicates with the pressure source through the conduit 21 via the directional valve 22. The counter-pressure then is so high that the link plate 13 is not pressed back by the links 7, 8 when the power producing cylinder 6 starts operating.

At the end of the closing movement the directional valve 22 is switched, which switching may be effected, for example, by a device 32 indicating that the movable mold plate 3 has arrived at a certain distance from the stationary mold plate 1 or thereby that the speed of the movable mold plate has decreased to a definite value. Owing to the design of the linkage, as a matter of fact, the speed of the movable mold plate 3 will decrease when the plate approaches the stationary mold plate 1.

The directional valve 22 then breaks the connection between the pressure source and the cylinder 20 and at the same time a connection between the cylinder 20 and a collection tank 31 is opened. The check valve 23 prevents a return flow of the pressure medium, but the pressure medium flows back to the tank 31 through the overflow valve 24 connected in parallel with the check valve. The overflow valve 24 is so adjustable that a desired low pressure in the cylinder 20 can be set. When the pressure against the link plate 13 increases, as a result of the movable mold half 4 abutting the stationary mold half 2 or abutting an object stuck between the mold halves, the low pressure in the back-pressure cylinder 20 is surmounted, and the link plate 13 is pressed back to its rearward position.

In summary, when there is no object stuck between the mold halves, the device operates as follows. Drive cylinder 6 moves the mold halves towards each other so that breaker elements 25, 26 make contact. However, the pressure in cylinder 20 prevents the drive cylinder 6 from moving link plate 13 toward stop 15. In the meanwhile, device 32 indicates that the movement of the mold half 4 has slowed and operates to switch valve 22 to switch cylinder 20 to low pressure. Therefore, as the pressure in drive cylinder 6 builds up, it overcomes the low pressure in cylinder 20, and drive cylinder 6 operates to move link plate 13 towards stop 15, so that the second set of breaker elements 27, 28 make contact. In this manner, the control means receives a signal from breaker elements 25, 26 before it receives a signal from breaker elements 27, 28, thereby indicating that no object is stuck between the mold halves. As a result, drive cylinder 6 operates to apply the final force to close the mold halves.

If an object is stuck between the mold halves, device 32 still operates to indicate that the movement of the mold half 4 has slowed and operates to switch valve 22 and change the pressure in cylinder 20 to a low pressure. In this manner, drive cylinder 6 operates to move link plate 13 towards stop 15 so that breaker elements 27, 28 are actuated before breaker elements 25, 26. When the control means receives a signal from breaker elements 27, 28 before it receives a signal from breaker elements 25, 26, it indicates that an object is stuck between the mold halves, and the control means operates to emit a pulse to the directional valve which retracts drive cylinder 6.

Although this invention has been described with respect to its preferred embodiments, it should be understood that many variations and modifications will now be obvious to those skilled in the art, and it is preferred, therefore, that the scope of the invention be limited, not by the specific disclosure herein, but only by the appended claims.

I claim:

1. An injection molding machine comprising: first and second mold halves mounted for relative movement along a longitudinal axis, a stop and a link plate each mounted along said longitudinal axis so that said link plate is movable towards said stop against a pressure device, drive means for driving said mold halves towards each other along said longitudinal axis and for driving said link plate towards said stop along said longitudinal axis, first control means for maintaining a high pressure in said pressure device for preventing contact between said link plate and said stop during the starting phase of the mold closing, second control means actuated in response to said mold halves moving together and arriving at a fixed distance relative to each other or the relative movement of said mold halves during closing decreasing in speed to a predetermined value for switching said pressure device from a high pressure to a low pressure so that said drive means drives said link plate and said stop into contact with each other, a first device operable to indicate to a third control means the contact of said mold halves during proper operation, a second device operable to indicate to said third control means the contact of said link plate and said stop, said third control means being operative to retract said drive means to move said mold halves away from each other when said third control means receives a signal from said second indicating device before it receives a signal from said first indicating device, thereby indicating that an object is stuck between said mold halves.

* * * * *